United States Patent
Okamoto

(10) Patent No.: US 11,130,529 B2
(45) Date of Patent: Sep. 28, 2021

(54) VEHICLE BODY REAR STRUCTURE

(71) Applicant: HONDA MOTOR CO., LTD., Tokyo (JP)

(72) Inventor: Yoshinori Okamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 16/824,205

(22) Filed: Mar. 19, 2020

(65) Prior Publication Data
US 2020/0307709 A1    Oct. 1, 2020

(30) Foreign Application Priority Data
Mar. 28, 2019    (JP) .............................. JP2019-065056

(51) Int. Cl.
*B62D 25/08*    (2006.01)
*B62D 25/04*    (2006.01)
*B62D 27/02*    (2006.01)

(52) U.S. Cl.
CPC ............. *B62D 25/08* (2013.01); *B62D 25/04* (2013.01); *B62D 27/023* (2013.01)

(58) Field of Classification Search
CPC ........ B62D 25/02; B62D 25/04; B62D 25/08; B62D 27/023
USPC ............. 296/203.01, 203.04, 193.06, 193.08
See application file for complete search history.

(56) References Cited

U.S. PATENT DOCUMENTS

2016/0221610 A1 * 8/2016 Nishiimura et al. ... B62D 25/04
2016/0264184 A1 * 9/2016 Ishihara ................. B62D 25/08

FOREIGN PATENT DOCUMENTS

| JP | H06-144289 A | | 5/1994 |
|---|---|---|---|
| JP | 3965914 B2 | * | 8/2007 |
| JP | 2015-123854 A | | 7/2015 |
| JP | 2018149945 A | * | 9/2018 |
| WO | 2015/190034 A1 | | 12/2015 |

* cited by examiner

*Primary Examiner* — Dennis H Pedder
(74) *Attorney, Agent, or Firm* — Rankin, Hill & Clark LLP

(57) ABSTRACT

A vehicle body rear structure includes: a rear wheel well disposed inside a vehicle body and extending in a longitudinal direction of the vehicle body; a rear pillar disposed rearward of the rear wheel well and extending in an upper-lower direction of the vehicle body; and a rear panel joined to the rear pillar and extending in the upper-lower direction. The rear pillar includes a pillar inner and a pillar outer disposed rearward of the pillar inner in the longitudinal direction of the vehicle body. The rear panel has a joint portion, at which the rear panel and the pillar inner are joined together, and the pillar outer has an opening at a position rearward of the joint portion in the longitudinal direction of the vehicle body.

6 Claims, 8 Drawing Sheets

VEHICLE BODY REAR STRUCTURE

CROSS-REFERENCE TO RELATED APPLICATION

This application claims the benefit of foreign priority to Japanese Patent Application No. 2019-065056, filed on Mar. 28, 2019, which is incorporated by reference in its entirety.

TECHNICAL FIELD

The present disclosure relates to a vehicle body rear structure.

BACKGROUND ART

A vehicle body rear structure including a rear fender panel and a rear pillar is conventionally known. For example, JP-H06-144289A discloses a vehicle body rear structure, in which a rear fender panel forms a lateral side surface of the vehicle body disposed outward of a rear pillar and a pillar outer forms a rear surface of the vehicle body disposed rearward of the rear pillar. To be more specific, in this vehicle body rear structure, the rear fender panel is bent inward in the vehicle width direction at the rear end thereof to provide a flange portion, at which the rear fender panel is joined to the pillar outer.

However, in such a conventional vehicle body rear structure disclosed in JP-H06-144289A, a component to be replaced or repaired may be often disposed inward of the pillar outer constituting the rear surface of the vehicle body.

If a target component to be replaced or repaired is disposed inside the vehicle body and the target component and another component are joined by welding, it is necessary that a weld be removed using a tool such as a drill. However, removing the weld from the target component disposed inside the vehicle body is difficult because of the presence of an exterior component such as the pillar outer.

In the case of replacement or repair of the target component disposed inside the vehicle body in this conventional vehicle body rear structure, the pillar outer and the rear fender panel are separated at the rear surface of the vehicle body first, and then the pillar outer disposed outward of the target component is disassembled to access the weld of the target component disposed inside the vehicle body. It is therefore extremely complicated in replacing and repairing the target component.

It is an object of this disclosure to provide a vehicle body rear structure which can facilitate an access to a component disposed inside a vehicle body.

SUMMARY

In one aspect, the present disclosure relates to a vehicle body rear structure comprising: a rear wheel well disposed inside a vehicle body and extending in a longitudinal direction of the vehicle body; a rear pillar disposed rearward of the rear wheel well and extending in an upper-lower direction of the vehicle body; and a rear panel joined to the rear pillar and extending in the upper-lower direction. The rear pillar comprises a pillar inner and a pillar outer disposed rearward of the pillar inner in the longitudinal direction of the vehicle body. The rear panel has a joint portion, at which the rear panel and the pillar inner are joined together. The pillar outer has an opening at a position rearward of the joint portion in the longitudinal direction of the vehicle body.

BRIEF DESCRIPTION OF THE DRAWINGS

The drawings described herein are for illustration purposes only and are not intended to limit the scope of the present disclosure in any way.

DETAILED DESCRIPTION

Figure 1:
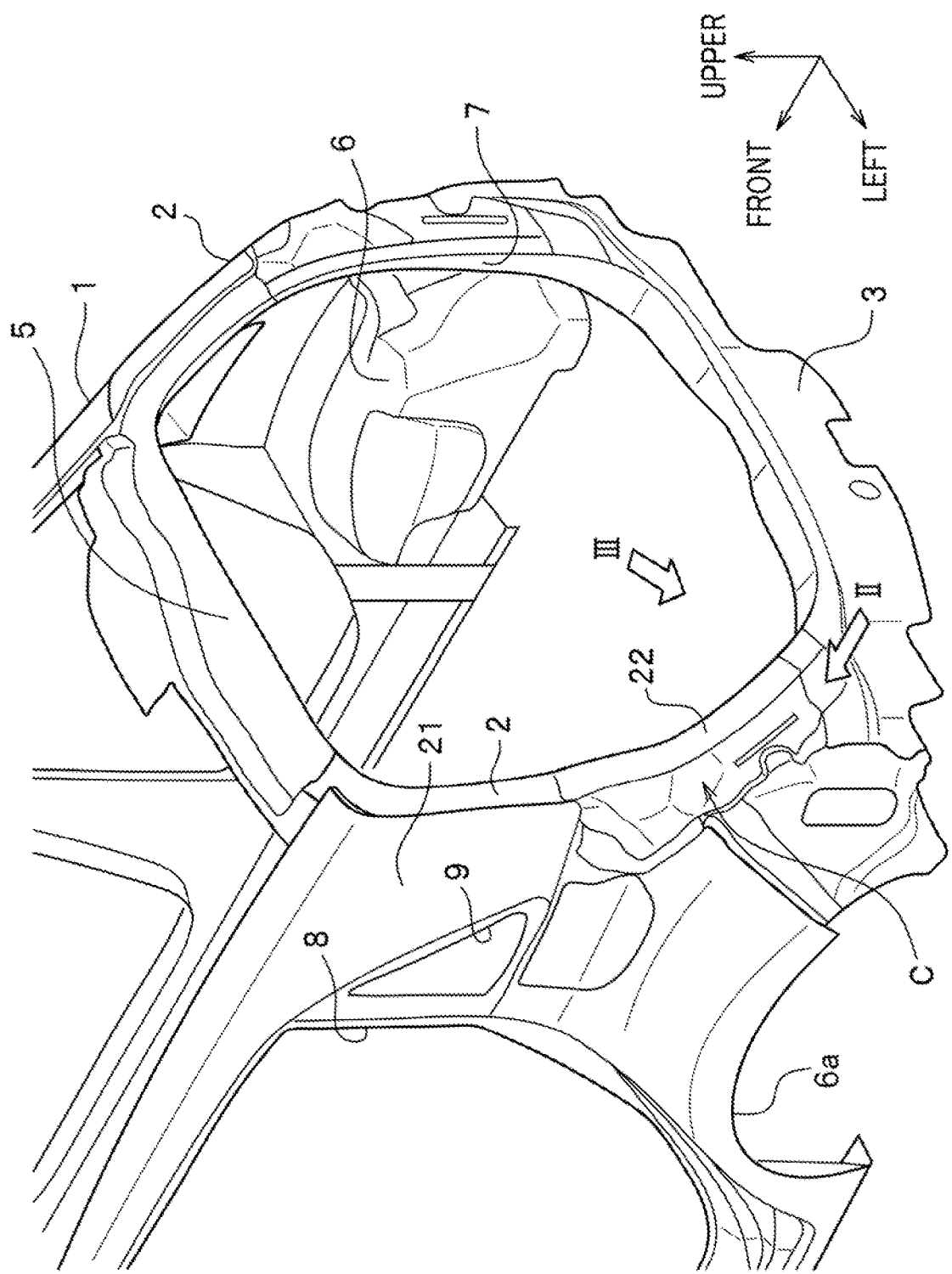
FIG. 1 is a partial perspective view of a vehicle body including a vehicle body rear structure according to one embodiment of the present disclosure.

A vehicle body rear structure according to one embodiment will be described with reference made to the accompanying drawings where appropriate. In the drawings to be referred to, upper-lower directions and front-rear directions indicated by arrows correspond respectively to upper-lower directions and longitudinal directions (front-rear directions) of a vehicle body. Further, inner (inside) and outer (outside) directions indicated by arrows in the figures correspond respectively to laterally inward and laterally outward directions (inward and outward in a vehicle width direction).

A vehicle body rear structure according to this embodiment has a main feature in that a pillar outer disposed at a rear side of a vehicle body and facing rearward in a longitudinal direction of the vehicle body has an opening at a position rearward of a joint portion, at which a rear panel and a pillar inner disposed frontward of the pillar outer are joined together.

The vehicle body rear structure according to this embodiment is adapted to right and left sides of the vehicle body. In the following description, since the vehicle body rear structure dispose at the rear right side of the vehicle body and the vehicle body rear structure dispose at the rear left side of the vehicle body are axisymmetric with respect to a center line in a vehicle width direction, only the rear left vehicle body rear structure will be described below and the description of the rear right vehicle body rear structure will be omitted.

Hereinafter, a vehicle body equipped with a vehicle body rear structure will be described first, and then the vehicle body rear structure will be described in detail.

Vehicle Body

FIG. 1 is a partial perspective view of a vehicle body 1 including a vehicle body rear structure C according to one embodiment of the present disclosure.

As seen in FIG. 1, a vehicle body 1 equipped with a vehicle body rear structure C includes a rear wheel well 6 disposed on each side (right side and left side) of the vehicle body 1 (one at the right side only is shown), a rear opening 7, a rear gate (not shown in the drawings) for opening and closing the rear opening 7, and a rear pillar 2 disposed on each right and left sides of the rear opening 7.

The rear pillars 2 are joined at their lower ends to end portions of a rear panel 3. The rear panel 3 defines a lower side of the rear opening 7. The rear pillars 2 are also joined at their lower ends to the rear wheel wells 6 through a rear end panel (not shown).

Further, the rear pillars 2 are joined at their upper ends to end portions of a rear roof rail 5. The rear roof rail 5 defines an upper side of the rear opening 7.

Each rear pillar 2 is made by joining a plurality of plate members extending in an upper-lower direction of the vehicle body 1. To be more specific, the rear pillar 2 according to this embodiment consists of an outer panel 21, a pillar outer 22, and a pillar inner 23 (see FIG. 3).

The outer panel 21 is disposed at a rear lateral side of the vehicle body 1 to form a laterally outer side (i.e., outer side in a vehicle width direction) of the rear pillar 2.

As described later, a rear edge of the outer panel 21 is joined to a laterally outer end portion (i.e., outer end portion in the vehicle width direction) of the rear panel 3 and also to the pillar outer 22.

Further, the outer panel 21 defines a rear door opening 8 at a lateral side portion of the vehicle body 1. The outer panel 21 also defines an attachment opening 9 for a quarter window (not shown) at the rear of the rear door opening 8.

The outer panel 21 also defines a wheel arch 6a at a position below the attachment opening 9 and corresponding to the rear wheel well 6.

Figure 2:
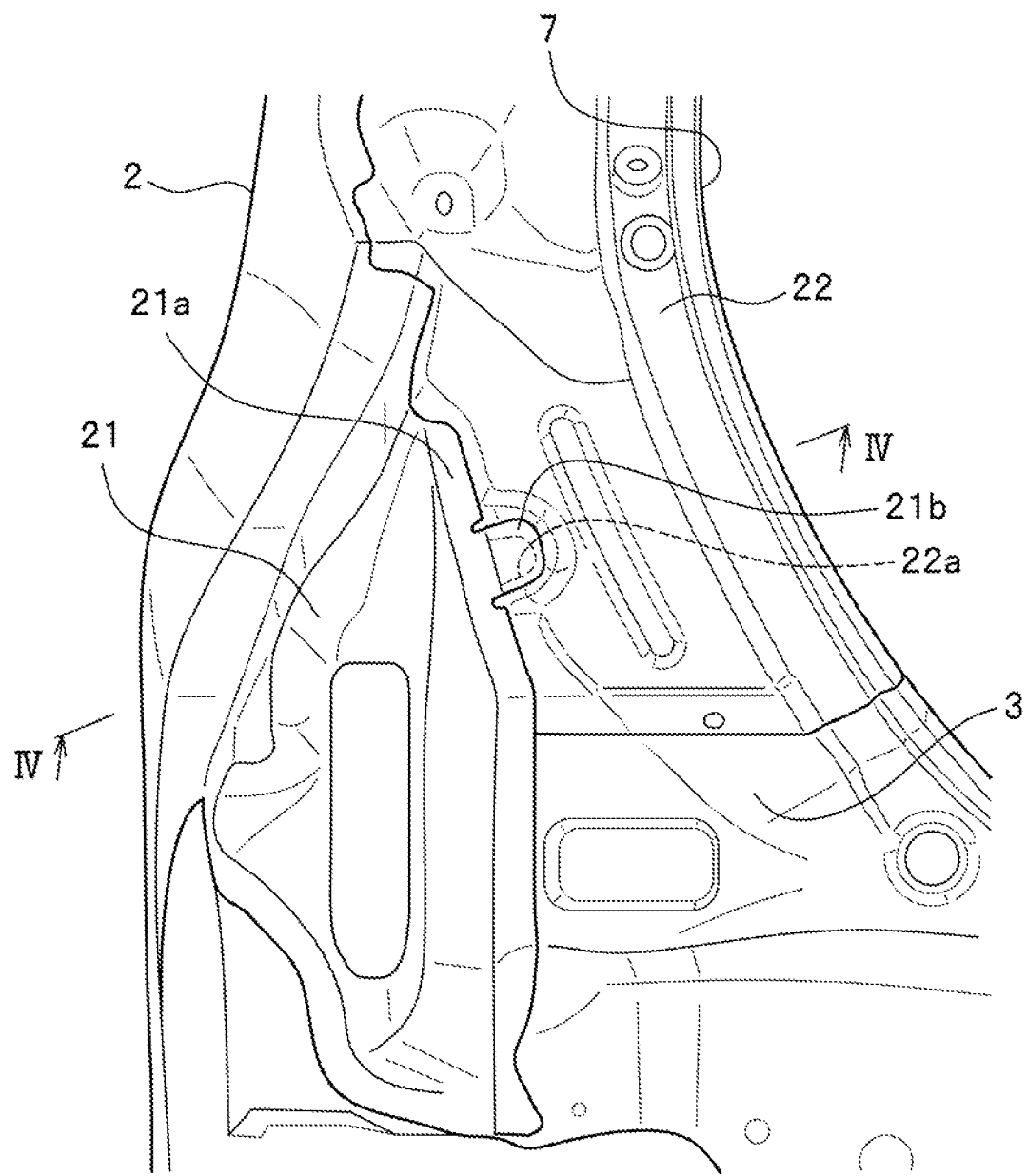
FIG. 2 is a partially enlarged perspective view of a portion viewed from the arrow II of FIG. 1.

FIG. 2 is a partially enlarged perspective view of a portion viewed from the arrow II of FIG. 1.

As seen in FIG. 2, the pillar outer 22 defines a rear surface of the rear pillar 2.

The pillar outer 22 is joined at its lower end to the laterally outer end portion of the rear panel 3. To be more specific, the laterally outer end portion of the rear panel 3 has an upwardly curved shape to form an extension portion, and the lower end portion of the pillar outer 22 is joined to the rear surface of the extension portion.

Although not shown in the drawings, at the front side of the pillar outer 22 the extension portion of the rear panel 3 extends farther upward and spaced apart from the joint portion between the rear panel 3 and the pillar outer 22. An upper end portion of the rear panel 3 is joined to a lower end portion of the pillar inner 23 (see FIG. 3) to be described later.

A laterally outer edge (i.e., outer edge in the vehicle width direction) of the pillar outer 22 is joined to a rear edge of the outer panel 21. To be more specific, the rear edge of the outer panel 21 has an edge portion 21a formed by bending the outer panel 21 inward in the vehicle width direction, and the laterally outer edge of the pillar outer 22 is joined, for example, by welding to the edge portion 21a while being disposed frontward of and positioned under the edge portion 21a of the outer panel 21.

The laterally outer end portion of the rear panel 3 is disposed frontward of and positioned under the edge portion 21a of the outer panel 21, and is joined to the edge portion 21a, for example, by welding.

In FIG. 2, the reference numeral 22a indicates an opening (shown by hidden line (dotted line)) formed in the pillar outer 22. The reference numeral 21b indicates a flange formed on the outer panel 21. The flange is provided to cover the opening 22a. The opening 22a and the flange 21b will be described later in detail.

Figure 3:
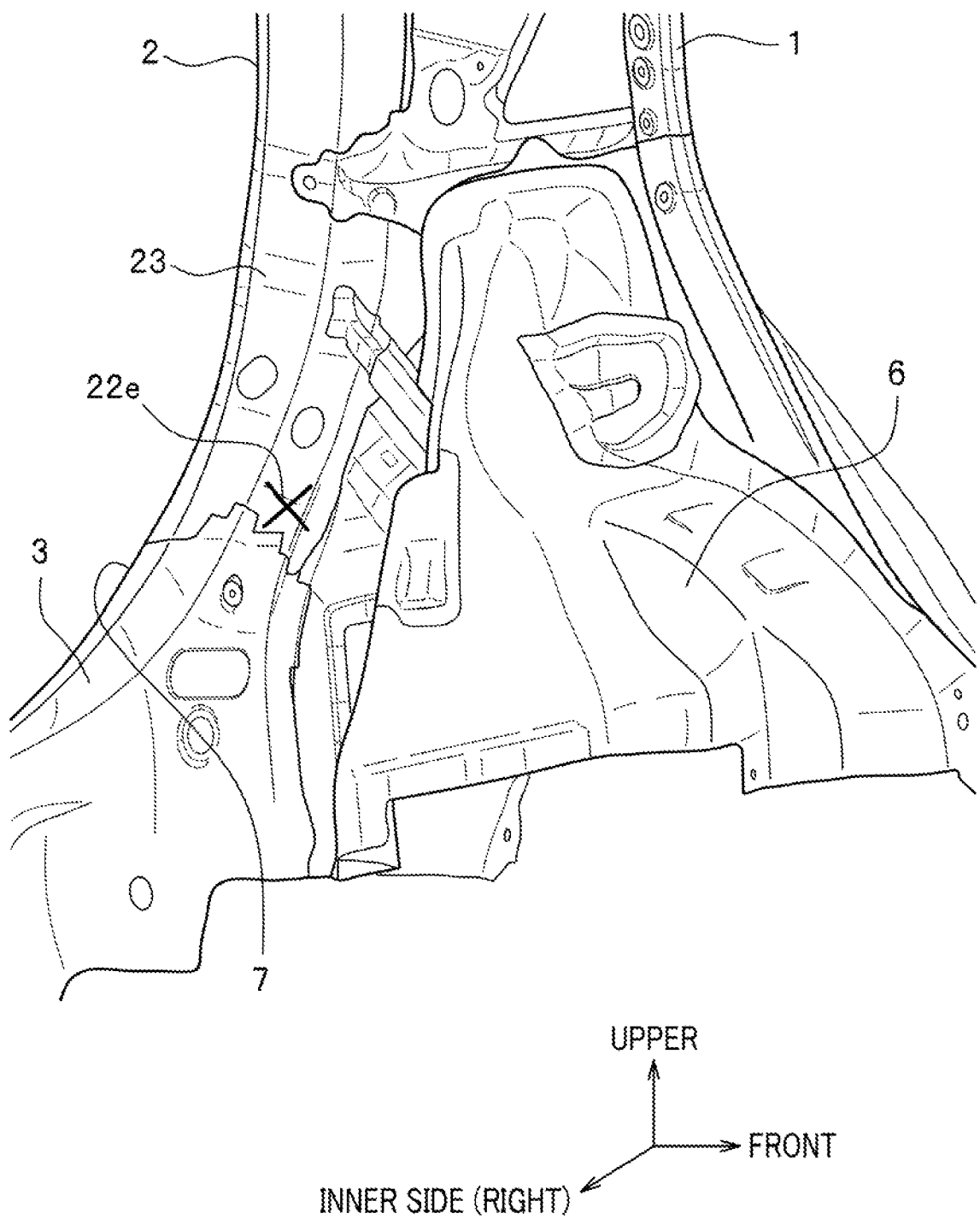
FIG. 3 is an enlarged perspective view of a lower end portion of the rear pillar constituting a vehicle body, when viewed from a passenger compartment as indicated by the arrow III of FIG. 1.

FIG. 3 is an enlarged perspective view of the lower end portion of the rear pillar 2 when viewed from a direction indicated by the arrow III of FIG. 1.

As seen in FIG. 3, the pillar inner 23 is bent into an L-shape along the rear opening 7 extending in the upper-lower direction, so that it defines a laterally inner side (i.e., inner side in the vehicle width direction) and a front surface of the rear pillar 2.

The lower end portion of the pillar inner 23 is joined to the rear panel 3. To be more specific, as described above, the rear panel 3 extends in the upper-lower direction at the front side of the pillar outer 22 (see FIG. 2) and overlaps the rear side (side facing outside of the vehicle body) of the lower portion of the pillar inner 23. The pillar inner 23 and the rear panel 3 are joined together at this overlapped portion.

In FIG. 3, the reference numeral 22e indicates a joint portion of the pillar inner 23 and the rear panel 3 at this overlapped portion. In this embodiment, the joint portion 22e is a weld (welding point) made by spot welding. The joint portion 22e is present on the front surface of the rear pillar 2 (pillar inner 23).

In FIG. 3, the reference numeral 6 indicates a rear wheel well.

As described above, the rear wheel well 6 extends in the longitudinal direction of the vehicle body 1 and has a shape corresponding to the wheel arch 6a (see FIG. 1). The rear wheel well 6 is disposed inside the vehicle body 1.

The joint portion 22e between the pillar inner 23 and the rear panel 3 is located near and opposite to the rear portion of the rear wheel well 6.

Further, the rear side (facing outside of the vehicle body 1) of the joint portion 22e is covered by the pillar outer 22 (see FIG. 3) constituting the rear pillar 2.

In general, when a tool such as a drill is moved in the passenger compartment (interior side of the vehicle body) to access the joint portion 22e, the rear wheel well 6 causes interference with the tool, so that the access of the tool becomes difficult or impossible.

Further, the access of the tool from the exterior side of the vehicle body 1 to the joint portion 22e is not possible due to the presence of the pillar outer 22.

As described hereinafter, the vehicle body rear structure C according to this embodiment can facilitate an access of the tool to the joint portion 22e.

Vehicle Body Rear Structure

Figure 4:
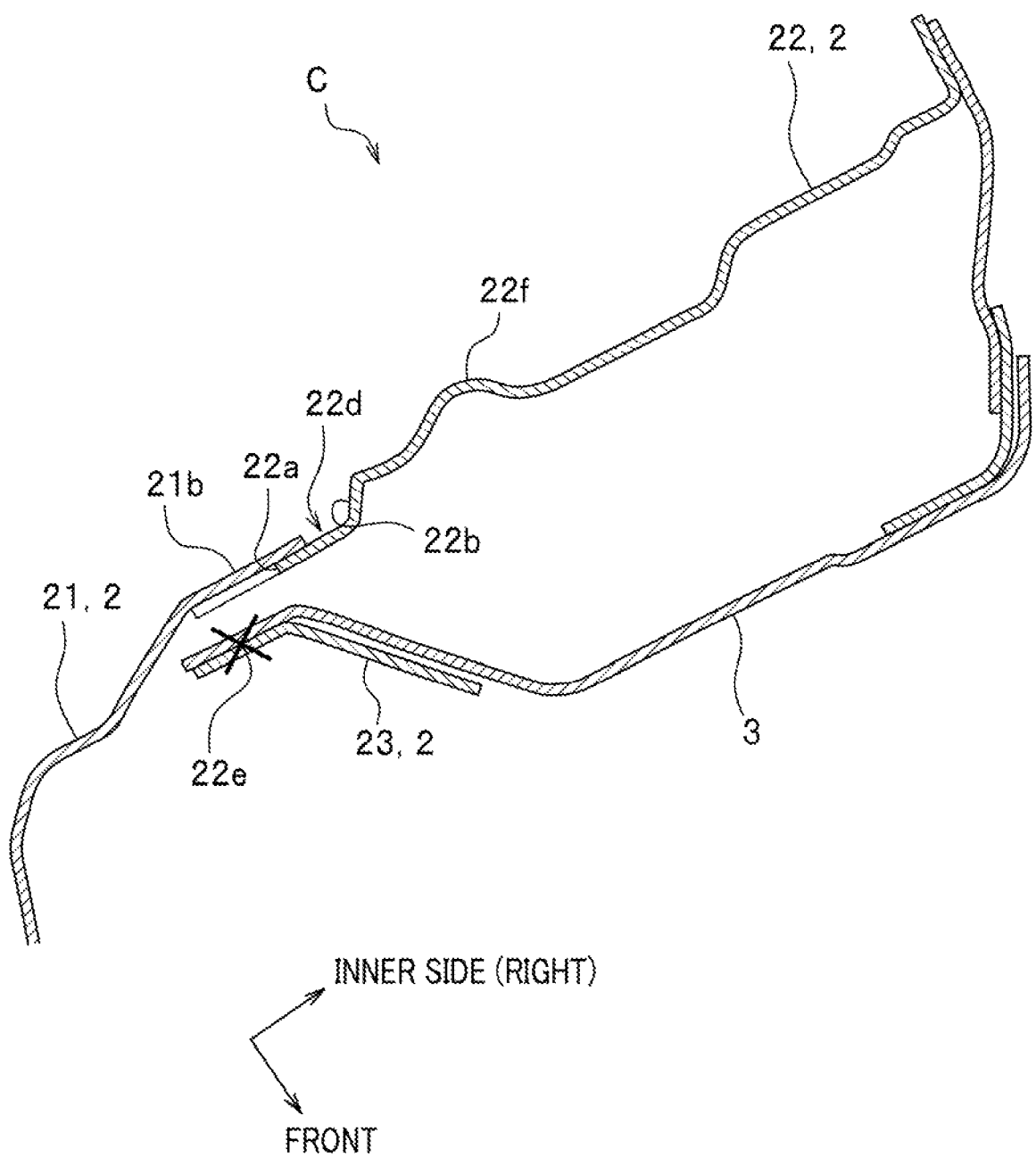
FIG. 4 is a sectional view taken along the line IV-IV of FIG. 2.
Figure 5:
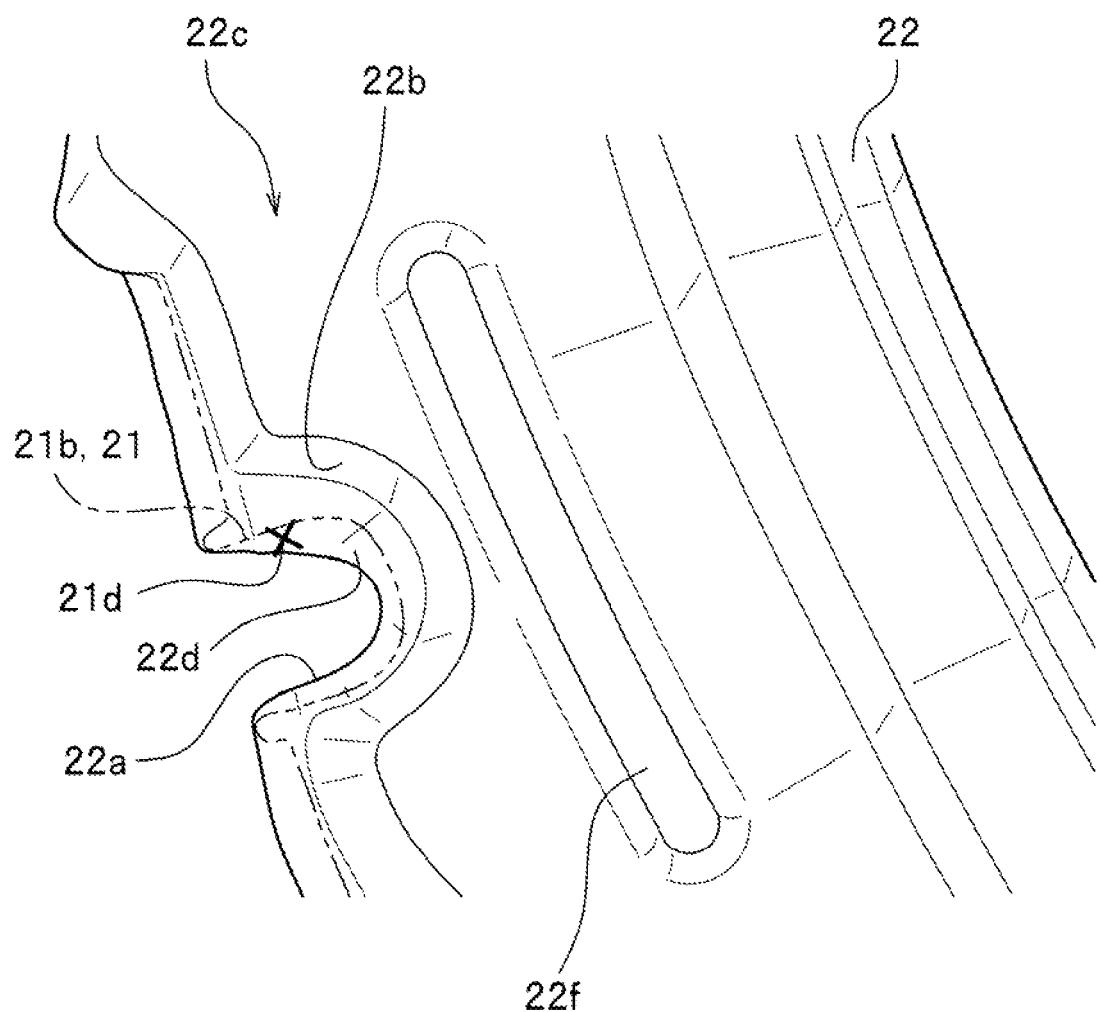
FIG. 5 is a partially enlarged perspective view of a pillar outer constituting the vehicle body rear structure, showing a portion thereof around an opening formed in the pillar outer.
Figure 6:
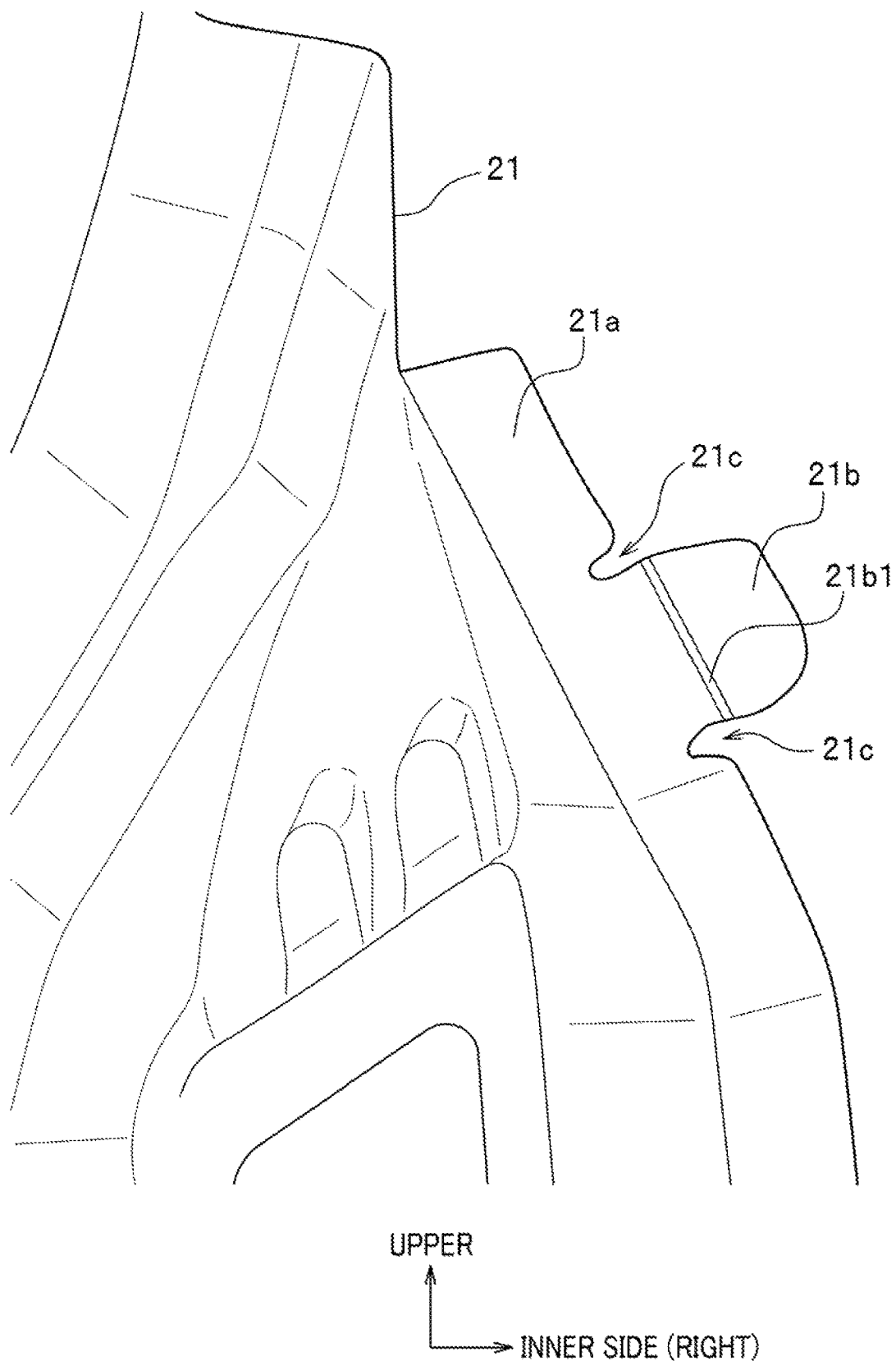
FIG. 6 is a partially enlarged perspective view of an outer panel constituting the vehicle body rear structure, showing a portion thereof around a flange of the outer panel.

FIG. 4 is a sectional view taken along the line IV-IV of FIG. 2. FIG. 5 is a partially enlarged perspective view of the pillar outer 22, showing a portion thereof around an opening 22a formed in the pillar outer. FIG. 6 is a partially enlarged perspective view of the outer panel 21, showing a portion thereof around the flange 21b of the outer panel 21.

It is to be noted that the flange 21b (see FIG. 6) disposed to cover the opening 22a is shown by phantom line (chain double-dashed line) in FIG. 5.

As seen in FIG. 4, the vehicle body rear structure C according to this embodiment includes the pillar outer 22, the pillar inner 23, and the rear panel 3. Further, the vehicle body rear structure C is configured such that the pillar outer 22 disposed at the rear side of the vehicle body 1 and facing rearward in the longitudinal direction of the vehicle body 1 has an opening 22a at a position rearward of the joint portion 22e (see also FIG. 3), at which the rear panel 3 and the pillar inner 23 disposed frontward of the pillar outer 22 are joined together, so that the joint portion 22e can be seen from the rear side of the vehicle body 1 through the opening 22a.

As seen in FIG. 5, the pillar outer 22 has the opening 22a at a laterally outer side (i.e., outer side in the vehicle width direction) of the pillar outer 22.

As seen in FIG. 4, the opening 22a is formed in the pillar outer 22 at a position corresponding to the joint portion 22e between the pillar inner 23 and the rear panel 3.

As seen in FIG. 5, the opening 22a is in a U-shape and opens toward the laterally outer edge (i.e., outer edge in the vehicle width direction) of the pillar outer 22 when viewed from the rear side.

The opening 22a is formed in a stepped portion 22d that is recessed frontward from a general surface 22c of the pillar outer 22.

With this configuration, a wall portion 22b is formed around the opening 22a to connect the general surface 22c and the stepped portion of the pillar outer 22.

The flange 21b of the outer panel 21 is positioned on the stepped portion 22d from the rear side of the pillar outer 22. Thereafter, the flange 21b is joined to the stepped portion 22d of the pillar outer 22 by welding and a weld 21d is formed either above or below the opening 22a.

According to this embodiment, as shown in FIG. 5, the flange 21b is spot-welded to the stepped portion 22d at a welding portion 21d that is located slightly above the opening 22a. However, the welding portion 21d may be located slightly below the opening 22a.

Further, the pillar outer 22 has a bead 22f near the opening 22a. The bead 22f is present on the general surface 22c of the pillar outer 22 to partly bulge rearward from the general surface 22c. The bead 22f is located inward of the opening 22a in the vehicle width direction of the vehicle body 1 and extends in the upper-lower direction.

In other words, the bead 22f is formed on the general surface 22c such that the stepped portion 22d and the wall portion 22b are interposed between the opening 22a and the bead 22f The bead 22f extends in the upper-lower direction near the opening 22a.

As seen in FIG. 6, the outer panel 21 has a flange 21b having a tongue-like shape and extending inward in the vehicle width direction. The flange 21b is formed on the outer panel 21 at a position corresponding to the opening 22a of the pillar outer 22 (see FIG. 5).

In this embodiment, the flange 21b protrudes inward in the vehicle width direction from the edge portion 21a of the outer panel 21; the edge portion 21a is positioned on top of the laterally outer edge of the pillar outer 22 (see FIG. 2) from the rear side of the pillar outer 22.

U-shaped notches 21c are formed in a root portion (proximal portion) of the flange 21b. When viewed from the rear side, a notch 21c is formed on each side of the flange 21b between the flange 21b and a portion of the outer panel 21 around the flange 21b.

In FIG. 6, the reference numeral 21b indicates a bendable portion provided at the root portion (proximal portion) of the flange 21b and extending in the longitudinal direction of the vehicle body 1.

The flange 21b is bent inward in the vehicle width direction at the bendable portion 21b1, so that an operator can fold back the flange 21b with ease to make the joint portion 22e visible from the rear side of the vehicle body 1 through the opening 22a (see FIG. 4).

Repairing or Replacement Operation

An example of procedures for repairing or replacing a component of the vehicle body rear structure C according to this embodiment will be described. This repairing or replacing operation is assumed to be made for replacement of the rear panel 3 (see FIG. 1) damaged, for example, by a rear-end collision.

In this replacing operation, the operator disengages, from the rear side of the vehicle body 1, the rear panel 3 from the outer panel 21 and the pillar outer 22 (see FIG. 2). This operation is done in the same manner as in the case of the conventional vehicle body rear structure.

Next, the operator disengages the pillar inner 23 and the rear panel 3 at the joint portion 22e shown in FIG. 3 to remove the rear panel 3 from the vehicle body 1 (see FIG. 1) for replacement. At this time, the rear wheel well 6 (see FIG. 3) causes interference with the tool such as a drill, so that the access of the tool from the interior side of the vehicle body 1 to the joint portion 22e (see FIG. 3) becomes difficult.

FIGS. 7A to 7D show procedures for repairing or replacing a component of the vehicle body rear structure C.

Figure 7A:
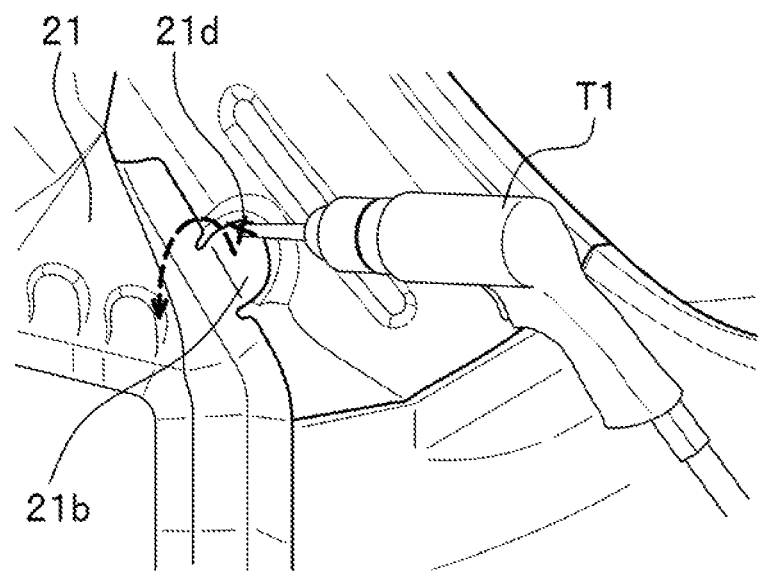
FIGS. 7A to 7D show procedures for repairing or replacing a component of the vehicle body rear structure.

In this repairing or replacing operation, as seen in FIG. 7A, the operator first grinds and removes the weld 21d between the flange 21b of the outer panel 21 and the pillar outer 22 from the rear side of the pillar outer 22 using a tool T1 such as a drill, so that the flange 21b is disengaged from the pillar outer 22.

Next, as shown by the arrow in FIG. 7A, the operator then folds back the flange 21b in a rearward direction away from the pillar outer 22.

Figure 7B:
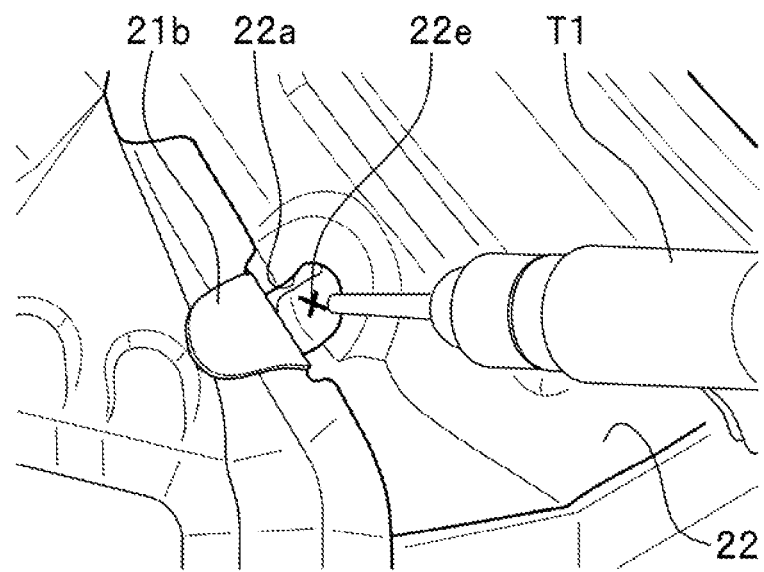

When the flange 21b is folded rearward as shown in FIG. 7B, the joint portion 22e can be seen from the operator through the opening 22a formed in the pillar outer 22a.

The operator then grinds and removes the joint portion 22e using the tool T1 to disengage the rear panel 3 (see FIG. 4) from the pillar inner 23, so that the damaged rear panel 3 can be replaced.

Figure 7C:
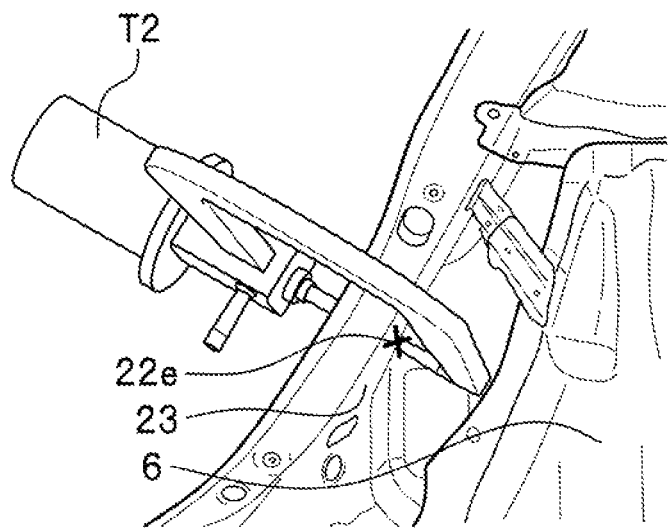

The newly replaced rear panel 3 and the pillar inner 23 are spot-welded at the joint portion 22e (see also FIG. 4). In this embodiment, as seen in FIG. 7C, spot-welding at the joint portion 22e is performed by a spot-welding machine T2 and it is assumed that electrodes of the spot-welding machine T2 can access a space between the joint portion 22e and the rear wheel well 6.

Figure 7D:
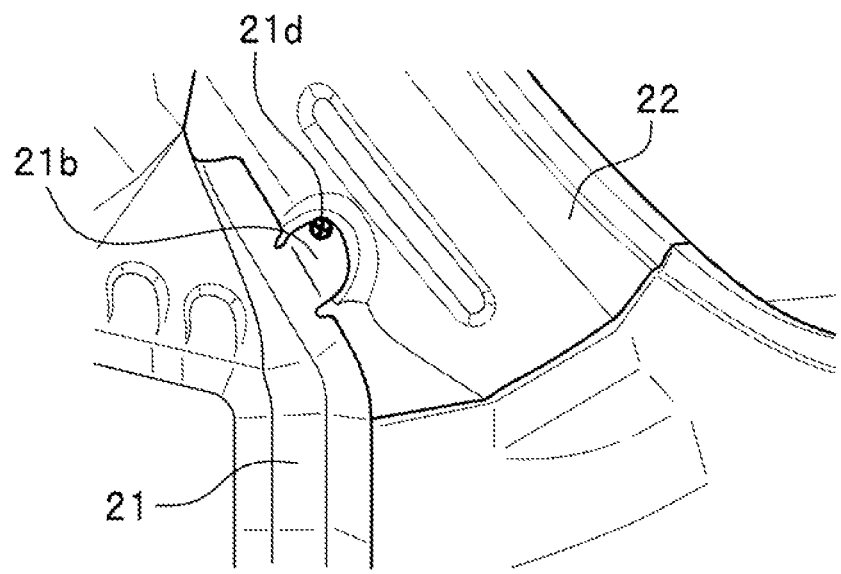

In this repairing or replacing operation, as shown in FIG. 7D, the operator returns the rearwardly folded flange 21b to the original position and spot-welds the flange 21b and the pillar outer 22 at a new weld 21d to complete the series of operational steps for the repairing or replacing operation.

Operation and Effects

Effects of the vehicle body rear structure C according to this embodiment will be described below.

According to the vehicle body rear structure C, the rear panel 3 has the joint portion 22e, at which the rear panel 3 and the pillar inner 23 are joined together, and the pillar outer 22 has the opening 22a at a position rearward of the joint portion 22e. Therefore, the vehicle body rear structure C can facilitate an access of the tool to the joint portion 22e that is disposed inside the vehicle body 1.

With this configuration of the vehicle body rear structure C, the rear panel 3 can be removed without removing the pillar outer 22. This can reduce the number of operational steps required for replacement of the rear panel 3.

According to the vehicle body rear structure C, the outer panel 21 has the flange 21b to cover the opening 22a of the pillar outer 22 from the rear side of the opening 22a (from rearward in the longitudinal direction of the vehicle body 1).

With this configuration of the vehicle body rear structure C, it is possible to prevent water and the like from flowing into the rear pillar 2 through the opening 22a.

According to the vehicle body rear structure C, the opening 22a is exposed to view by folding back the flange 21b. Accordingly, the vehicle body rear structure C allows the joint portion 22e to be seen from the rear side of the vehicle body 1 through the opening 22a.

Further, the vehicle body rear structure C has the wall portion 22b around the opening 22a; the wall portion 22b rises rearward in the longitudinal direction of the vehicle body 1.

With this configuration of the vehicle body rear structure C, it is possible to increase the rigidity and the strength of the pillar outer 22 around the opening 22a.

According to the vehicle body rear structure C, the pillar outer 22 has the bead 22f near the opening 22a.

With this configuration of the vehicle body rear structure C, it is possible to further increase the rigidity and the strength of the pillar outer 22 around the opening 22a.

According to the vehicle body rear structure C, at least one of the upper portion and the lower portion of the flange 21b in the upper-lower direction of the vehicle body 1 is joined by spot welding to the surface of the pillar outer 22 around the opening 22a.

With this configuration of the vehicle body rear structure C, it is possible to further improve water resistance of the flange 21b with respect to the opening 22a.

Further, this configuration of the vehicle body rear structure C makes it possible to reduce the length of the flange 21b in the vehicle width direction as compared with an alternative configuration in which spot welding is performed remote from the opening 22a at a portion inward in the vehicle width direction. Accordingly, the weight of the vehicle body rear structure C can be reduced.

The wall portion 22b is shortened in the vehicle width direction in accordance with the reduced length of the flange 21b in the vehicle width direction and thus extension of the wall portion 22b inwardly in the vehicle width direction can be suppressed. This can suppress a reduction in rigidity and strength of the pillar outer 22 due to provision of the opening 22a.

Further, according to the vehicle body rear structure C, the outer panel 21 has a notch 21c formed between the flange 21b and a portion of the outer panel 21 around the flange 21b.

With this configuration of the vehicle body rear structure C, the operator can fold back the flange 21b with ease thanks to the notch 21c.

Further, with this configuration of the vehicle body rear structure C, even if the operation of folding back the flange 21b and restoring the flange to the original state is repeated, the provision of the notch 21c can prevent a stress concentration at the root portion of the flange 21b. Accordingly, the service life of the flange 21b is less degraded due to this repeated operation of folding back the flange 21b and restring the flange 21b to the original state.

Although the present disclosure has been described with reference to one embodiment, the present disclosure is not limited to the above-described embodiment and various changes and/or modifications may be made without departing from the scope of the claims.

What is claimed is:

1. A vehicle body rear structure comprising:
   a rear wheel well disposed inside a vehicle body and extending in a longitudinal direction of the vehicle body;
   a rear pillar disposed rearward of the rear wheel well and extending in an upper-lower direction of the vehicle body; and
   a rear panel joined to the rear pillar and extending in the upper-lower direction,
   wherein the rear pillar comprises a pillar inner and a pillar outer disposed rearward of the pillar inner in the longitudinal direction of the vehicle body,
   wherein the rear panel has a joint portion, at which the rear panel and the pillar inner are joined together, and
   wherein the pillar outer has an opening at a position rearward of the joint portion in the longitudinal direction of the vehicle body.

2. The vehicle body rear structure according to claim 1, further comprising an outer panel joined to a laterally outer side of the pillar outer and constituting a laterally outer surface of the vehicle body,
   wherein the outer panel has a flange to cover the opening from a rear side of the opening.

3. The vehicle body rear structure according to claim 2, wherein at least one of an upper portion and a lower portion of the flange in the upper-lower direction of the vehicle body is joined by spot welding to a surface of the pillar outer around the opening.

4. The vehicle body rear structure according to claim 2, wherein a notch is formed between the flange and a portion of the outer panel around the flange.

5. The vehicle body rear structure according to claim 1, wherein the pillar outer has a wall portion rising rearward in the longitudinal direction of the vehicle body around the opening.

6. The vehicle body rear structure according to claim 1, wherein the pillar outer has a bead near the opening.

* * * * *